(12) United States Patent  (10) Patent No.: US 7,392,593 B2
Rivers et al.  (45) Date of Patent: Jul. 1, 2008

(54) ANGLE METER AND SPIRIT LEVEL

(75) Inventors: Paul Rivers, Cullman, AL (US);
Frederick Diggle, III, Mountain Brook, AL (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 600 days.

(21) Appl. No.: 11/004,377

(22) Filed: Dec. 3, 2004

(65) Prior Publication Data

US 2006/0124390 A1   Jun. 15, 2006

(51) Int. Cl.
*G01C 9/12* (2006.01)
(52) U.S. Cl. .............................. 33/333; 33/391; 182/18
(58) Field of Classification Search .................. 33/333, 33/334, 391; 182/18
See application file for complete search history.

(56) References Cited

U.S. PATENT DOCUMENTS

| 126,372 | A | * | 5/1872 | Barnum | 33/391 |
|---|---|---|---|---|---|
| 1,623,463 | A | * | 4/1927 | Collins | 33/391 |
| 1,856,436 | A | * | 5/1932 | Schueller | 33/333 |
| 2,845,719 | A | | 8/1958 | Thomiszer | 33/333 |
| 3,118,234 | A | | 1/1964 | Wilson | 33/371 |
| 4,394,799 | A | * | 7/1983 | Moree et al. | 33/371 |
| 4,554,994 | A | | 11/1985 | Weiner | 182/18 |
| 5,058,283 | A | * | 10/1991 | Wise et al. | 33/333 |
| 5,680,707 | A | * | 10/1997 | Boelling | 33/333 |
| 5,740,881 | A | * | 4/1998 | Lensak | 33/391 |
| 5,956,855 | A | | 9/1999 | Foss et al. | 33/333 |

* cited by examiner

*Primary Examiner*—Christopher W Fulton
(74) *Attorney, Agent, or Firm*—Thomas, Kayden, Horstemeyer, & Risley, LLP

(57) ABSTRACT

The angle meter and spirit level apparatus can be affixed to a ladder and used to determine the angle at which the ladder is placed. The apparatus is also self-verifying in that it provides a way to know that the apparatus is operating properly. The apparatus also allows for a ladder or other similar device to be used as a carpenter's level or mason's level to determine true horizontal and also to determine the slope from the horizontal.

17 Claims, 4 Drawing Sheets

ANGLE METER AND SPIRIT LEVEL

TECHNICAL FIELD

The present disclosure is generally related to ladder safety and measuring slope.

BACKGROUND

Effectively positioning a ladder against a utility pole or other vertical structure has long been a safety concern. Ladders are a leading cause of fall-related fatalities and other serious injuries. Ladder inclination is the angle of the ladder from the horizontal. If the ladder inclination is too steep, the risk of injury is increased because the ladder is more likely to fall backward under load. If the ladder inclination is not steep enough, the risk that the ladder will slide out from under the ladder user increases.

To ensure that a ladder may be ascended safely, the ladder should be placed at an angle of approximately 75° from the horizontal. When positioning a ladder, it is difficult to determine quickly and with certainty that the angle is correct. Various types of ladder inclination indicators have been developed to show that the angle of the ladder is correct. However, most of these devices allow for a range of safe angles, or else provide no way to be certain that the device is operating correctly.

Consequently, among other needs, a need exists for an apparatus that may be used to show that a ladder is at a safe inclination.

SUMMARY

In response to these and other shortcomings, an angle meter and spirit level apparatus is disclosed. The angle meter and spirit level apparatus can be affixed to a ladder and used to determine the angle at which the ladder is placed. The apparatus is also self-verifying in that it provides a way to know that the apparatus is operating properly. The apparatus also allows for a ladder or other similar device to be used as a carpenter's level or mason's level to determine true horizontal and also to determine the slope from the horizontal.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is an exploded perspective view showing the assembly of the various parts of the angle meter and spirit level apparatus of FIG. 1.

DETAILED DESCRIPTION OF THE PREFERRED EMBODIMENT

Figure 1:
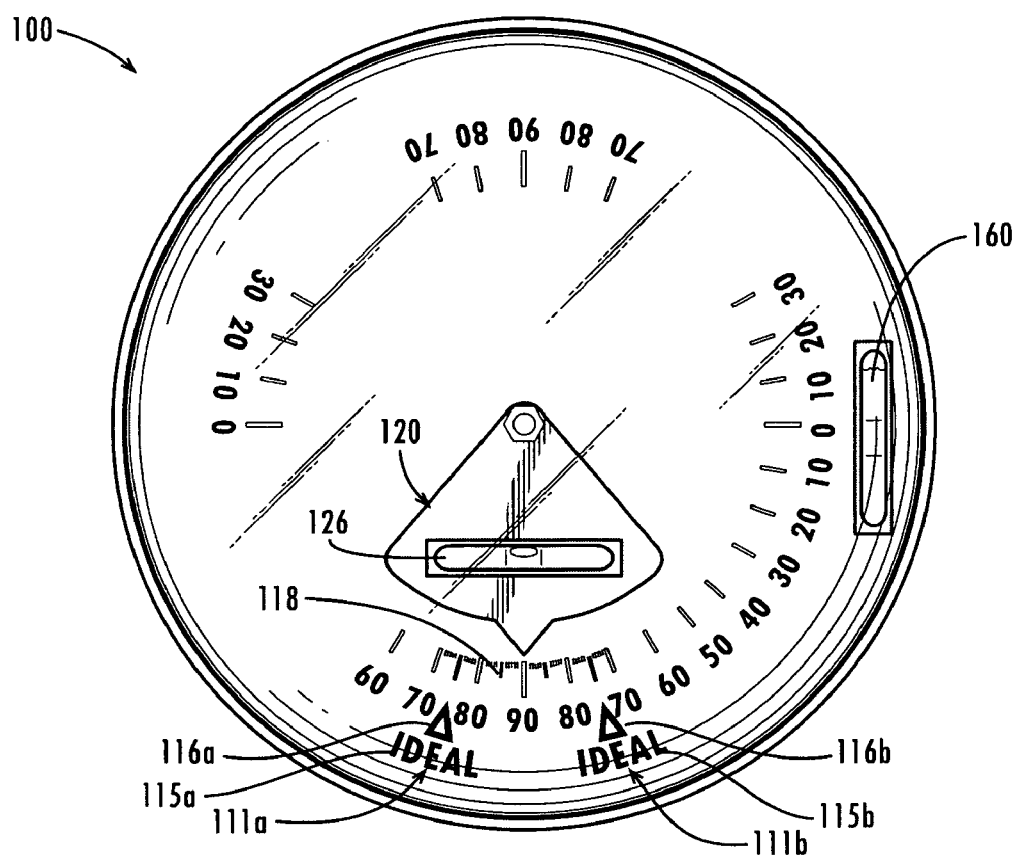
FIG. 1 is a front view of the angle meter and spirit level apparatus, in accordance with one embodiment

Reference will now be made in detail to a representative assembly illustrated in the drawings. While one embodiment of an angle meter and spirit level apparatus will be described in connection with these drawings, there is no intent to limit it to the embodiment or embodiments disclosed therein.

FIGS. 1 through 7 illustrate an angle meter and spirit level apparatus 100 that can be affixed to a ladder 200 to show the angle against a wall or other vertical structure. Further, the apparatus 100 allows the ladder 200 to function, for example, as a carpenter's level or a mason's level, showing whether the ladder 200 is perfectly horizontal or showing the degree of slope.

Figure 2:
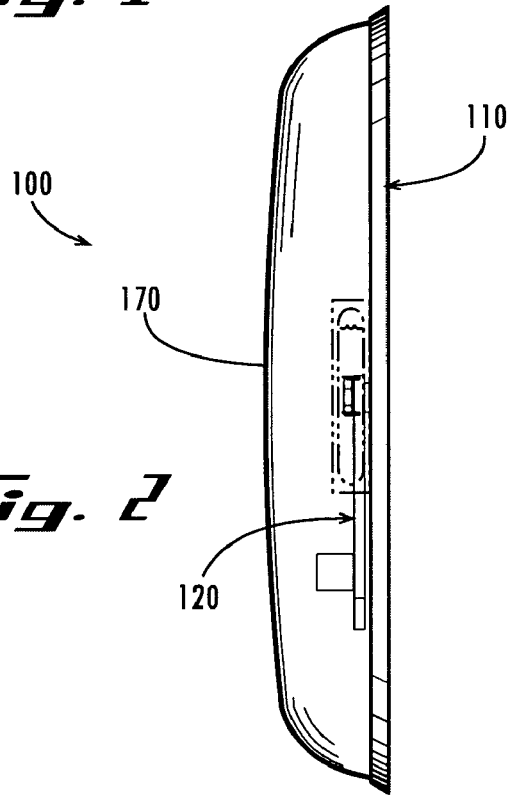
FIG. 2 is a side view of the angle meter and spirit level apparatus of FIG. 1.
Figure 1:
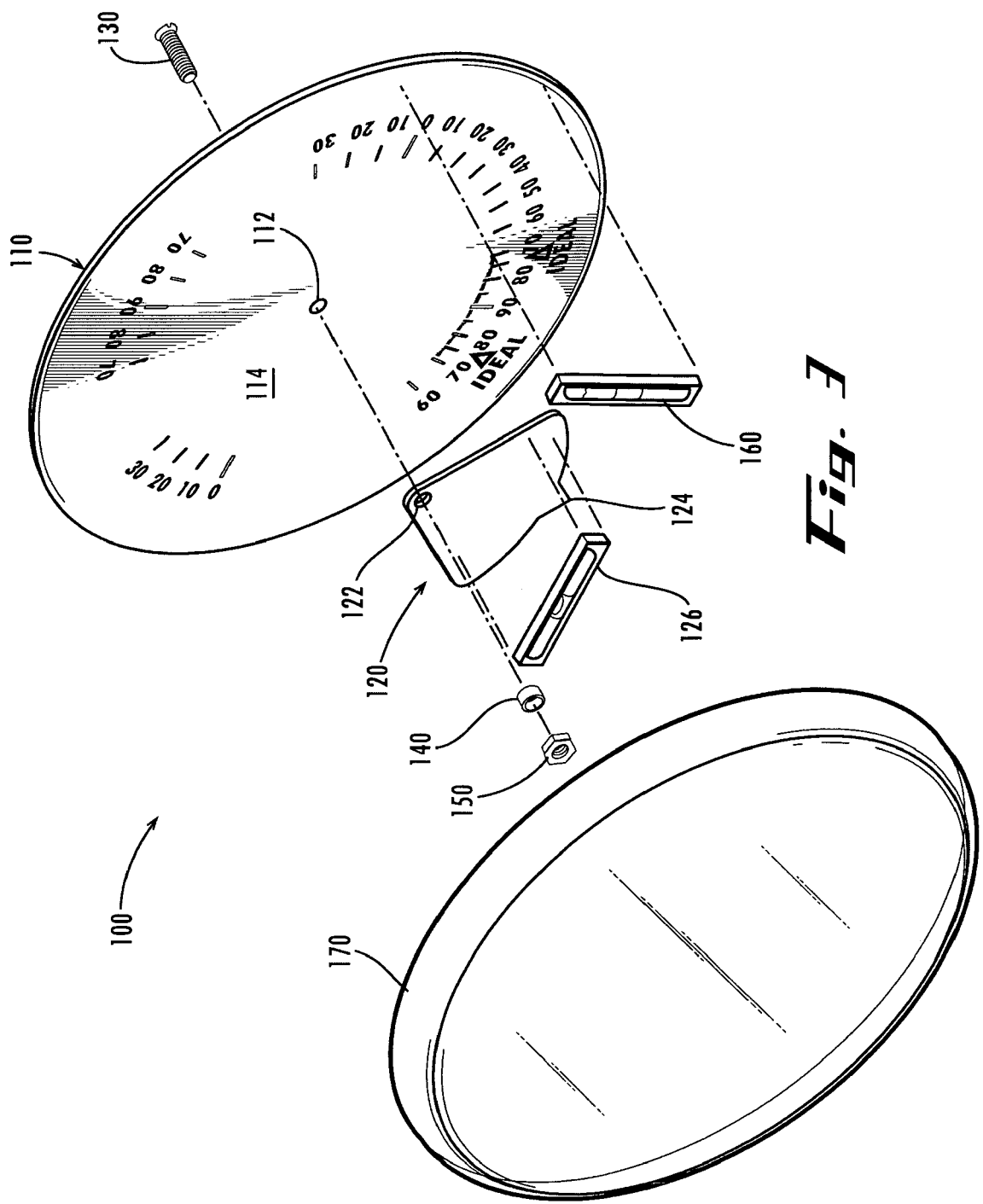
Figure 4:
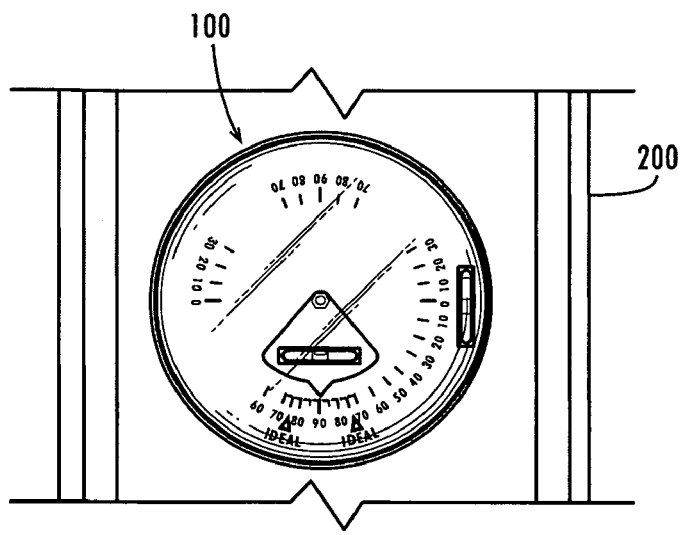
FIG. 4 is a view of the angle meter and spirit level apparatus of FIG. 1 affixed to the rail of a ladder.

As illustrated in FIG. 1 and FIG. 2, the angle meter and spirit level apparatus 100 includes a base 110 for securing the apparatus 100 to a ladder 200 (FIG. 4). The base 110 is flat and would typically be substantially circular in shape, though other embodiments include square, rectangular and other shapes. The base 110 would typically be affixed to the ladder 200 as shown in FIG. 4 via epoxy or glue, among others. One of ordinary skill in the art will appreciate that the base 110 may also be affixed to the ladder 200 via numerous methods including, for example, bolts or screws, among others. The base 110 would typically be constructed from rigid plastic, though aluminum, metal or any other desired material could be used as would be appreciated by one of skill in the art.

As illustrated in FIG. 1 and FIG. 3, the angle meter and spirit level apparatus 100 includes a mechanism for determining true vertical, such as a pivot member 120. The pivot member 120 is substantially pie-shaped with a pivot hole 122 near the top that is used to attach the pivot member 120 to the base 110. The pivot member 120 should be designed to be free-swinging and equally weighted so that gravity will cause the pivot member 120 to hang in a true vertical position. A pointer 124 at the bottom-center of the pivot member 120 will indicate the true vertical when the pivot member 120 is swinging freely. Similarly to the base 110, the pivot member 120 would typically be constructed from rigid plastic, though aluminum, metal or any other desired material could be used as would be appreciated by one of skill in the art.

As illustrated in FIG. 1 and FIG. 3, the angle meter and spirit level apparatus 100 also indicates the angle of inclination from horizontal using true vertical as a reference point, such as is shown by angle markings 118. The angle markings 118 appear on the face 114 of the base 110. The angle markings 118 extend around the circular face 114 of the base 110, as shown. The angle markings 118 extend from 0° to 90° to 0° to 90° and back to the original 0° marking. Preferably, the angle markings 118 are oriented such that the 90° markings align with the length of the ladder 200 and the 0° markings align from side-to-side of the rails of the ladder 200. In this fashion, the pivot member 120 will point to 90° when the ladder 200 is placed in true vertical position and will point to 0° when the ladder 200 is placed in true horizontal position.

Figure 5:
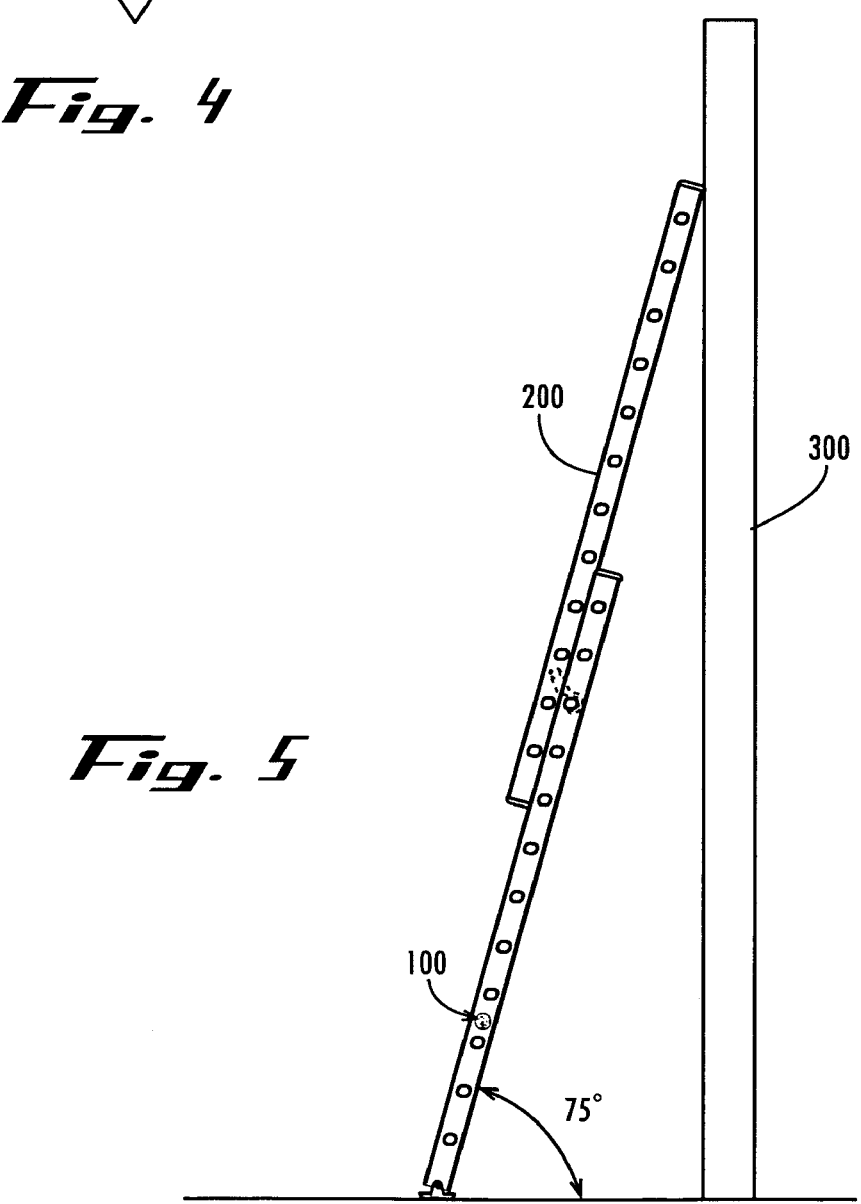
FIG. 5 is a view of the angle meter and spirit level apparatus of FIG. 1 affixed to a ladder shown at the proper inclination.

When the ladder 200 is inclined against a vertical structure such as a pole 300 or a wall, gravity will still cause the pivot member 120 to freely swing in a true vertical position as shown in FIG. 5. The angle measurement between the ladder and the ground (horizontal) is complementary to the angle between the ladder and true vertical and can be determined by observing the angle marking 118 on the face 114 of the angle meter and spirit level apparatus 100.

It is desirable to verify that the angle shown by the pivot member 120 is correct, therefore the angle meter and spirit level apparatus 100 includes a mechanism for indicating that the angle of inclination is accurate, such as the pivot spirit level 126 shown in FIG. 1 and FIG. 3. A pivot spirit level 126 is affixed to the pivot member 120 in such a way as to be perpendicular to the direction of the pointer 124. The pivot spirit level 126 will preferably be of the horizontal block vial variety and may be attached to the pivot member 120 via glue or epoxy. One of skill in the art will recognize that many varieties of pivot spirit level 126 may be selected and affixed to the pivot member 120 in numerous ways so long as the pivot spirit level 126 is perpendicular to the pointer 124. When the ladder is inclined and the pivot member 120 is free-swinging at true vertical, the air bubble inside the vial should be centered between the markings on the pivot spirit level 126 as is known in the art, and the user can be certain that the angle indicated by the apparatus 100 is correct.

As shown in FIG. 3, the angle meter and spirit level apparatus 100 preferably comprises an assembly for rotatably affixing the pivot member 120 to the base 110, such as a bolt 120 and nut 150. The bolt 120 extends through a fastening hole 112 in the base 110, through the pivot member 120 and the bushing 140, and is secured by the nut 150. The bolt 120 would preferably be of the sunken-head type so as not to interfere with fitting the base 110 flush against the side of the ladder 200. Of course, one of ordinary skill in the art would recognize that any fastener that preserves the free-swinging nature of the pivot member 120 could be used to secure the pivot member 120 to the base 110.

As shown in FIG. 1, the angle meter and spirit level apparatus 100 comprises indicia of ideal safe angles of 75° from the horizontal, such as the ideal angle markings 111a, 111b. The ideal angle markings 111a, 111b are each made up of a triangle 116a, 116b and the words "IDEAL" 115a, 115b pointing to the 75° indicator angle markings 118, and are imprinted on the face 114 of the base 110 of the apparatus 100. It is understood that 75° is an ideal angle of inclination for the safe use of a ladder 200. The ideal angle markings 111a, 111b could be imprinted via ink, could be carved into the face 114, or could be affixed in any other manner known and appreciated by one of skill in the art. Of course, terms such as "SAFE" or any other like term could be used to indicate that the angle is desirable. Similarly, a range of safe angles could be indicated for circumstances where the range of safe ladder inclination is broader than the suggested 75°. This increased range of safe usage angles could be impacted by variation in the materials of the ground as well as the vertical structure against which the ladder 200 is inclined.

As illustrated in FIG. 2 and FIG. 3, the angle meter and spirit level apparatus 100 further comprises a mechanism for preventing debris from contaminating the apparatus 100, such as a cover 170. The cover 170 is constructed from clear, rigid plastic, and is substantially bowl shaped to fit over the base 110 and protect the remainder of the apparatus 100. Of course, the cover 170 could be constructed of any substantially transparent material as would be appreciated by one of skill in the art. Likewise, the cover 170 could be constructed to be removable from the base 110. For example, the cover 170 could snap into place on the base 110, or be secured by fasteners attached to the base 110, or be secured by any other suitable fastening methodology. A removable cover 170 would allow the apparatus 100 to be inspected and/or cleaned as necessary. As would be appreciated by one of skill in the art, a removable cover 170 would not necessarily need to be clear or transparent, and the apparatus 100 could be used without the cover 170 in place.

As illustrated in FIG. 1, FIG. 2, FIG. 3, and FIG. 4, the angle meter and spirit level apparatus 100 further include a device for determining true horizontal, such as a fixed spirit level 160. A fixed spirit level 160 is affixed to the face 114 of the base 110 in such a way as to be parallel to the 90° angle markings 118. The fixed spirit level 160 will typically be of the horizontal block vial variety and may be attached to the face 114 of the base 110 via glue or epoxy. One of skill in the art will recognize that many varieties of fixed spirit level 160 may be selected and affixed to the face 114 of the base 110 in numerous ways so long as the fixed spirit level 160 is parallel to the 90° angle markings 118. When the ladder 200 is laid on its side as in FIG. 7, the fixed spirit level 160 may be used to determine whether the ladder 200 is at true horizontal. When the air bubble inside the vial is centered between the markings on the fixed spirit level 160 as is known in the art, the user can be certain that the ladder 200 is at true horizontal.

Figure 6:
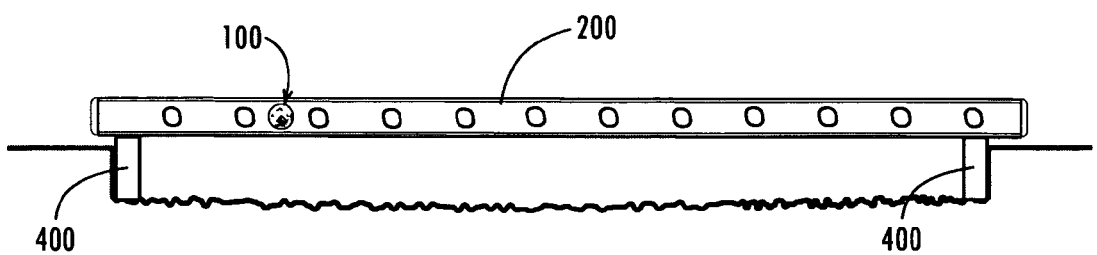
FIG. 6 is a view of the angle meter and spirit level apparatus of FIG. 1 in use to determine horizontal slope.

As shown in FIG. 1 and FIG. 6, the angle meter and spirit level apparatus 100 provides for determining slope from the true horizontal, such as with angle markings 118 discussed previously. When the apparatus is affixed to the ladder 200 in such a way that the 90° angle markings 118 are parallel to the length of the ladder, then the ladder may be laid on its side to measure slope. At true horizontal, the pointer 124 of the pivot member 120 will point to the 0° angle marking 118. If the ladder 200 is sloped, then the pointer 124 of the pivot member 120 will point to the angle marking 118 indicating the degree of slope.

Use of the angle meter and spirit level apparatus 100 for determining safe ladder inclination requires leaning the ladder 200 against a pole 300 or other vertical structure as illustrated in FIG. 5. The distance from the base of the pole 300 to the foot of the ladder 200 should be a distance approximating one-fourth the length of the extended ladder 200. The angle meter and spirit level apparatus 100 should next be examined to verify that the angle of inclination is approximately 75°. If the angle is less than 75°, then the base of the ladder should be adjusted toward the base of the pole 300. If the angle is greater than 75°, then the base of the ladder 200 should be adjusted away from the base of the pole 300. After each successive adjustment of the base of the ladder 200, the angle meter and spirit level apparatus 100 should be examined to determine whether the angle of inclination is suitable. Further, the pivot member 120 should be examined to be certain that it is still free-swinging and thus functioning correctly, i.e., under the influence of gravity. If the pivot member 120 is free-swinging, then the air bubble will be centered between the markings inside the vial of the pivot spirit level 126.

Figure 7:
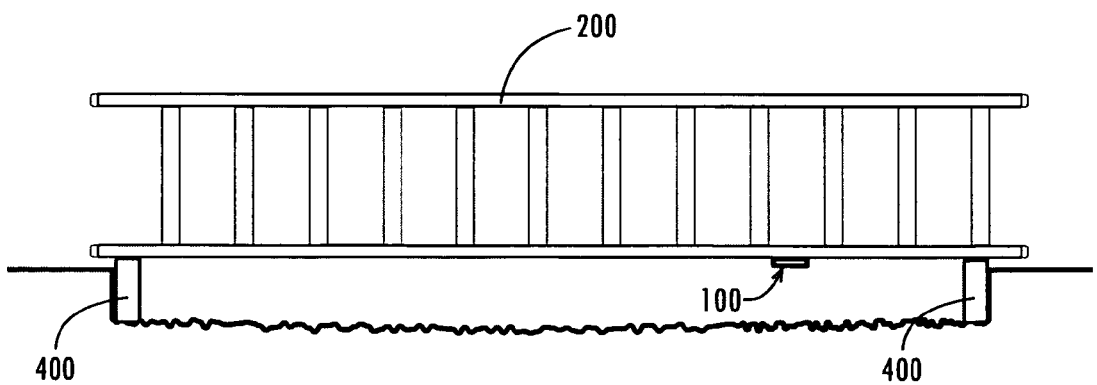
FIG. 7 is a view of the angle meter and spirit level apparatus of FIG. 1 in use to determine true horizontal level.

The angle meter and spirit level apparatus 100 may also be used to determine true horizontal, for example in large projects such as pouring concrete. The ladder would be laid across the forms 400 as shown in FIG. 7. If the air bubble inside the vial is centered between the markings on the fixed spirit level 160 of the apparatus 100 as is known in the art, the user can be certain that the ladder 200 is at true horizontal.

The angle meter and spirit level apparatus 100 may also be used to determine the slope from true horizontal, for example in pouring concrete or asphalt in a driveway where some level of slope is desired for drainage. The ladder would be laid across the forms 400 as shown in FIG. 6. If the ladder 200 is sloped, then the pointer 124 of the pivot member 120 will point to the angle marking 118 indicating the degree of slope. If the slope indicated is not correct, then the forms 400 could be readjusted and then the measurement may be checked again.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. An apparatus for indicating the inclination of ladders, comprising:
    a base;
    a gravitationally influenced pivot member having a pointer;
    a fastener connecting the pivot member to the base; and
    a spirit level affixed to the pivot member.

2. The apparatus of claim 1, further comprising a transparent cover affixed to the base.

3. The apparatus of claim 1, wherein the base is substantially circular.

4. The apparatus of claim 1, further comprising markings on the face of the base to indicate angle measurements.

5. The apparatus of claim 1, wherein the markings indicate angles from 0° to 90° and back to 0° around the circumference of the base.

6. The apparatus of claim 1, wherein the spirit level is perpendicular to the pointer.

7. The apparatus of claim 1, further comprising a second spirit level affixed to the base.

8. The apparatus of claim 7, wherein the second spirit level is parallel to the 90° markings on the base.

9. An apparatus for indicating the inclination of a ladder, comprising:
    means for securing the apparatus to the ladder;
    means for determining true vertical;
    means for indicating angle of inclination using true vertical as a reference point;
    means for indicating that said angle of inclination is accurate; and
    means for affixing the true vertical determination means to the securing means.

10. The apparatus of claim 9, further comprising means for preventing debris from contaminating the apparatus.

11. The apparatus of claim 10, wherein the means for preventing debris from contaminating the apparatus is removable.

12. The apparatus of claim 9, further comprising means for indicating an ideal safe angle of 75° from the horizontal.

13. The apparatus of claim 9, further comprising means for determining true horizontal.

14. The apparatus of claim 13, further comprising means for determining slope from the true horizontal.

15. A method for determining the safe inclination of a ladder where an angle meter and spirit level apparatus is affixed to the side of the ladder, comprising:
    leaning the ladder against a substantially vertical service such that the distance from the base of a vertical surface to the lower end of the ladder is approximately one-fourth the length of the ladder;
    verifying that the angle of inclination as shown on the angle meter and spirit level is approximately 75°;
    if the angle of inclination is less than 75°, then adjusting the base of the ladder toward the base of the vertical surface, and if the angle of inclination is greater than 75°, then adjusting the base of the ladder away from the base of the vertical surface; and
    repeating the verifying step and the adjusting step as necessary until the angle of inclination is approximately 75°,
    wherein the angle meter and spirit level apparatus includes a pivot member configured to indicate a true vertical and a spirit level configured to verify accuracy of the pivot member.

16. A method for determining whether a ladder is at true horizontal where an angle meter and spirit level apparatus is affixed to the side of the ladder, comprising:
    laying the ladder in a substantially horizontal position; and
    confirming that an air bubble is between the markings on a fixed spirit level of the apparatus,
    wherein the angle meter and spirit level apparatus includes a pivot member configured to indicate a true vertical and a spirit level configured to verify accuracy of the pivot member.

17. A method for determining the slope of a ladder where an angle meter and spirit level apparatus is affixed to the side of the ladder, comprising:
    laying the ladder in a substantially horizontal position; and
    reading the slope angle as shown by a pointer on the angle meter and spirit level,
    wherein the angle meter and spirit level apparatus includes a pivot member configured to indicate a true vertical and a spirit level configured to verify accuracy of the pivot member.

* * * * *